United States Patent [19]
Chou et al.

[11] Patent Number: 5,905,897
[45] Date of Patent: May 18, 1999

[54] METHOD AND APPARATUS FOR SELECTING A NONBLOCKED INTERRUPT REQUEST

[75] Inventors: Hong-Chich Chou, Hsinchu; Jerng-Cherng Fan, Hsingchu; Won-Yih Lin, Taichung; Ching-Chin Huang, Hsinchu, all of Taiwan

[73] Assignee: Industrial Technology Research Institute, Hsinchu, Taiwan

[21] Appl. No.: 08/822,183

[22] Filed: Mar. 20, 1997

[51] Int. Cl.$^6$ .................................................. G06F 9/46
[52] U.S. Cl. .................... 395/733; 395/735; 395/740; 395/672
[58] Field of Search ..................... 395/733–742, 395/672–675, 390–391

[56] References Cited

U.S. PATENT DOCUMENTS

| | | | |
|---|---|---|---|
| 4,438,489 | 3/1984 | Heinrich et al. | 395/737 |
| 4,495,569 | 1/1985 | Kagawa | 395/741 |
| 4,546,430 | 10/1985 | Moore et al. | 395/740 |
| 4,959,781 | 9/1990 | Rubinstein et al. | 395/735 |
| 5,101,497 | 3/1992 | Culley et al. | 395/734 |
| 5,109,512 | 4/1992 | Bahr et al. | 395/673 |
| 5,125,093 | 6/1992 | MFarland | 395/739 |
| 5,179,707 | 1/1993 | Piepho | 395/733 |
| 5,283,904 | 2/1994 | Carson et al. | 395/739 |
| 5,293,620 | 3/1994 | Barabash et al. | 395/672 |
| 5,515,538 | 5/1996 | Kleiman | 395/735 |
| 5,555,430 | 9/1996 | Gephardt et al. | 395/733 |
| 5,560,019 | 9/1996 | Narad | 395/733 |
| 5,590,328 | 12/1996 | Seno et al | 395/675 |
| 5,613,128 | 3/1997 | Nizar et al. | 395/739 |
| 5,689,713 | 11/1997 | Normoyle et al. | 395/736 |
| 5,742,823 | 4/1998 | Edwards et al. | 395/672 |

*Primary Examiner*—Ayaz R. Sheikh
*Assistant Examiner*—Sumati Lefkowitz
*Attorney, Agent, or Firm*—Proskauer Rose LLP

[57] ABSTRACT

An interrupt processing method and apparatus particularly well-suited for use in an interrupt controller of a multiprocessor system or device. Each of the interrupt requests has at least one destination processor associated therewith for servicing the interrupt request. An interrupt controller in accordance with the present invention applies latched interrupt requests to a priority compare tree which serves to prioritize received interrupt requests. A number of higher priority requests, including the highest priority request, are supplied to a destination selection circuit which includes an interrupt dispatcher which determines a processor to which the first priority interrupt request will be dispatched. Similar determinations are made for the remaining identified interrupt requests, but with the corresponding destination register contents masked to prevent processors already selected to receive a higher priority interrupt from being considered for a lower priority interrupt. The destination selection circuit attempts to determine a unique destination processor for each of the highest priority interrupt requests, such that these multiple interrupt requests can therefore be dispatched to different processors simultaneously. One or more of the interrupt requests may be "blocked" during a particular time period because all destination processors which could service the blocked requests are already processing other interrupts, performing higher priority tasks or are otherwise unavailable. These blocked interrupt requests are identified and the corresponding destination registers are masked such that the remaining non-blocked interrupt requests can be delivered to an available destination processor.

13 Claims, 15 Drawing Sheets

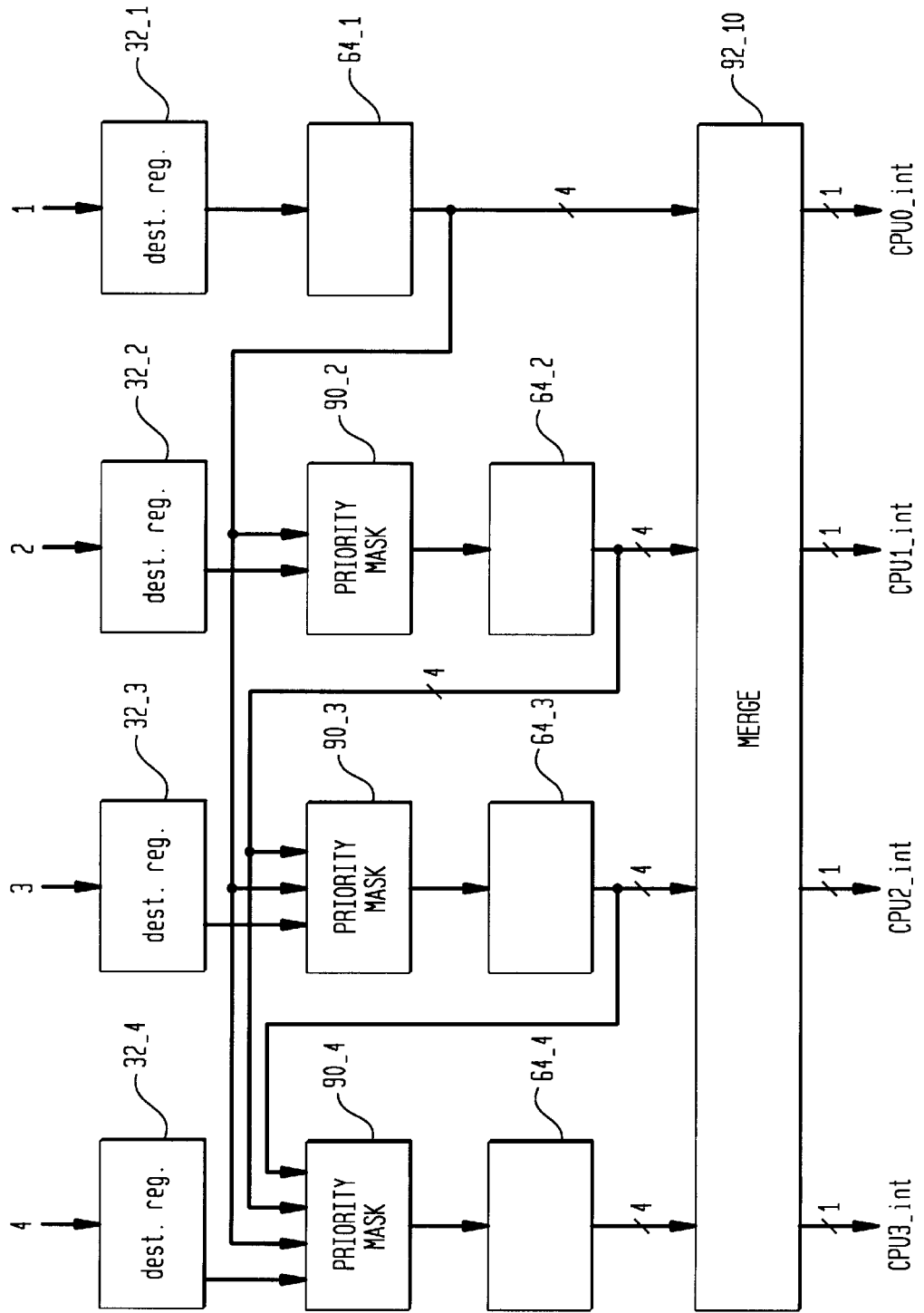

METHOD AND APPARATUS FOR SELECTING A NONBLOCKED INTERRUPT REQUEST

RELATED APPLICATION

This invention is related to U.S. patent application Ser. No. 08/822,191, entitled "Method and Apparatus for Dispatching Multiple Interrupt Requests Simultaneously," filed on even date herewith for Hong-Chich Chou, Jerng-Cherng Fan, Tsahn-Yih Chang and Po-Chuan Kang. The contents of the above-noted application is incorporated herein by reference.

FIELD OF THE INVENTION

The present invention relates to interrupt processing in processor-based systems and devices. More particularly, the invention relates to interrupt processing which permits simultaneous delivery of multiple interrupts and/or permits selection of a non-blocked interrupt request in a multiprocessor system.

BACKGROUND OF THE INVENTION

FIG. 1 shows a conventional multiprocessor system 10 with distributed interrupt control. The system 10 includes four processors (CPUs) CPU1, CPU2, CPU3 and CPU4 each coupled to a CPU bus 12 and interrupt bus 16. The system 10 further includes I/O controller 14 coupled to the interrupt bus 16. The I/O controller 14 directs the transfer of data to and from peripheral devices such as displays, printers and disk drives. Each of the CPUs and the I/O controller 14 have an embedded Advanced Programmable Interrupt Controller (APIC) associated therewith coupled to the interrupt bus 14. Each APIC includes a hardware state machine for processing interrupt requests in a conventional manner. For example, the APIC of I/O controller 14 broadcasts interrupts to all of the CPUs over the interrupt bus 16. A problem with the distributed interrupt control of system 10 is that each of the CPUs and I/O controller must include a separate APIC, which unduly increases the cost and complexity of the system.

FIG. 2 shows a conventional multiprocessor system 20 with centralized interrupt control. The system 20 includes four processors (CPUs) CPU1, CPU2, CPU3 and CPU4 coupled to a CPU bus 22, and a Multiple Processor Interrupt Controller (MPIC) 24 coupled to a Peripheral Component Interconnect (PCI) bus 26 and an interrupt bus 25. The CPU bus 22 and PCI bus 26 are interconnected by a CPU-to-PCI bus bridge 28 which regulates the bidirectional flow of data between the PCI bus 26 and CPU bus 22. The MPIC 24 dispatches a given interrupt to the appropriate destination CPU of the interrupt rather than broadcasting the interrupt to all CPUs. The MPIC is generally configured such that only the current highest priority interrupt is dispatched at any particular time. An exemplary MPIC is described in greater detail in Donald W. McCauley, "Power PC Multiprocessor Interrupt Controller (MPIC)," IBM Power Personal Systems, Austin Tex., pp. 1–22, Aug. 14, 1995, which is incorporated by reference herein.

The multiprocessor systems 10 and 20 of FIGS. 1 and 2 are referred to as symmetrical multiprocessor systems because each of the CPUs CPU1, CPU2, CPU3 and CPU4 has the ability to receive and process interrupt requests. For example, the MPIC 24 in system 20 receives all of the interrupt requests, and dispatches them to the appropriate CPUs such that the interrupt requests are processed evenly across the CPUs. The above-cited IBM reference includes a specification referred to as OpenPIC which facilitates this type of multiprocessor interrupt processing. In accordance with the OpenPIC specification, each interrupt request has a destination register, a vector register and a priority register associated therewith. The destination register is used to identify which CPUs can service a particular interrupt request, the vector register holds the starting address in system memory of the interrupt service routine for the particular interrupt request, and the priority register indicates the relative priority of the particular interrupt request. In operation, the MPIC 24 detects an interrupt signal from an I/O device coupled to the PCI bus 26, and determines which CPU or CPUs to which the corresponding interrupt request should be dispatched using the information in the above-noted destination register. A CPU to which the interrupt is dispatched detects the interrupt request, reads the interrupt vector to determine the starting address of the interrupt service routine, and executes the interrupt service routine.

A number of significant problems limit the efficiency of conventional multiprocessor interrupt controllers such as MPIC 24 of FIG. 2. For example, a conventional interrupt controller can usually select and dispatch only the current highest priority interrupt request at a given time. After the current highest priority interrupt request is dispatched, but before it is received and accepted by the destination CPU, the interrupt controller will generally prevent the selection and dispatch of any further interrupt requests. It is therefore usually not possible to dispatch multiple interrupt requests simultaneously to different destination CPUs. Moreover, the current highest priority interrupt may be blocked because all of its possible destination CPUs are busy either handling interrupt requests or performing other tasks having a higher priority than the current highest priority interrupt. Conventional interrupt controllers are unable to mask blocked interrupt requests that cannot be dispatched so as to avoid preventing the selection and dispatch of non-blocked interrupt requests. These problems substantially undermine the efficiency of conventional interrupt controllers and thereby degrade the performance of multiprocessor systems which include such interrupt controllers.

As is apparent from the above, there is a need for a multiprocessor interrupt controller in which multiple interrupt requests can be dispatched simultaneously to different destination CPUs, and in which blocked interrupt requests which cannot be dispatched at a particular time are masked to thereby allow the selection and dispatch of non-blocked interrupt requests.

SUMMARY OF THE INVENTION

The present invention provides an improved interrupt processing method and apparatus particularly well-suited for use in a multiprocessor interrupt controller. The interrupt controller may be configured to dispatch multiple interrupt requests simultaneously. The interrupt controller may also be configured to select a highest priority non-blocked interrupt request from multiple pending non-blocked interrupt requests, such that when all possible destination processors of the highest priority interrupt request are unavailable, the remaining non-blocked interrupt requests can be selected and dispatched.

One aspect of the invention relates to the simultaneous delivery of multiple interrupt requests in a multiple processor system. As noted above, conventional interrupt controllers generally dispatch only a single interrupt request at a time, and system performance is therefore limited. An interrupt controller in accordance with the present invention may include a pending interrupt register which latches interrupt requests received from various external sources. The outputs of the pending interrupt register are applied to a priority compare tree which includes multiple levels of comparators and serves to prioritize the received interrupt requests. An exemplary embodiment for use in a system with four processors identifies four higher priority interrupt requests, including the highest priority interrupt request. These requests are supplied to a destination selection circuit which utilizes destination registers for storing a four-bit indicator for each of the four identified interrupt requests with each bit of the indicator specifying whether or not a particular one of the four processors is a possible destination register for the corresponding interrupt request. The destination processor information for the first priority interrupt (which is also the highest priority) is applied to a first interrupt dispatcher which determines the processor to which the first priority interrupt request will be dispatched. Similar determinations are made for the second, third and fourth identified interrupt requests, but with the destination register contents masked to prevent those processors already selected to receive an interrupt from being considered for duplicate selection. The destination selection circuit thus attempts to determine a unique destination processor for each of the four identified interrupt requests identified by the priority compare tree circuit. In this manner, the interrupt controller is able to ensure that there will be no conflict in the destination processors of the four identified interrupt requests, and these multiple interrupt requests can therefore be dispatched to different processors simultaneously. This provides considerable improvement in overall system efficiency relative to conventional interrupt controllers which are able to dispatch only a single interrupt request at a time.

Another aspect of the invention relates to an interrupt control technique in which blocked or otherwise non-dispatchable interrupt requests are masked and thereby prevented from being selected for dispatch. Instead of selecting the highest priority interrupt request from all pending interrupt requests as in a conventional interrupt controller, the interrupt control technique of the present invention involves selecting the highest priority interrupt request from all non-blocked interrupt requests. An exemplary method includes the steps of masking all blocked interrupt requests that cannot be dispatched at a particular time because all destination processors associated with the blocked interrupt requests are processing other interrupts, performing other higher priority tasks or are otherwise unavailable. The remaining non-blocked interrupt request having the highest priority is then selected for dispatch to an available processor. The masking process may utilize processor availability indicators supplied from the destination processors, as well as identifiers of the particular interrupt requests which have been accepted by each of the processors as a result of a previous interrupt selection process. Interrupts accepted in a previous selection process may be removed from a current interrupt selection process, such that performance-limiting repetition is considerably reduced.

These and other features and advantages of the present invention will become more apparent from the accompanying drawings and the following detailed description.

BRIEF DESCRIPTION OF THE DRAWINGS

FIG. 11 shows an exemplary destination selection circuit suitable for use in the interrupt controller of FIG. 9.

DETAILED DESCRIPTION OF THE INVENTION

The present invention will be illustrated below using an exemplary CPU-based system. It should be understood, however, that the described techniques are more generally applicable to any other data processing application in which multiple interrupt requests are processed. The terms "CPU" and "processor" as used herein are intended to include any device which can accept an interrupt request and execute associated interrupt handling instructions. The term "interrupt request" is intended to include any physical signal asserted by an external device indicating that the device has reached a particular state and requires processing. The term "interrupt controller" refers to a device which coordinates interrupt requests and routes the requests to an appropriate destination CPU or CPUs.

Figure 1:
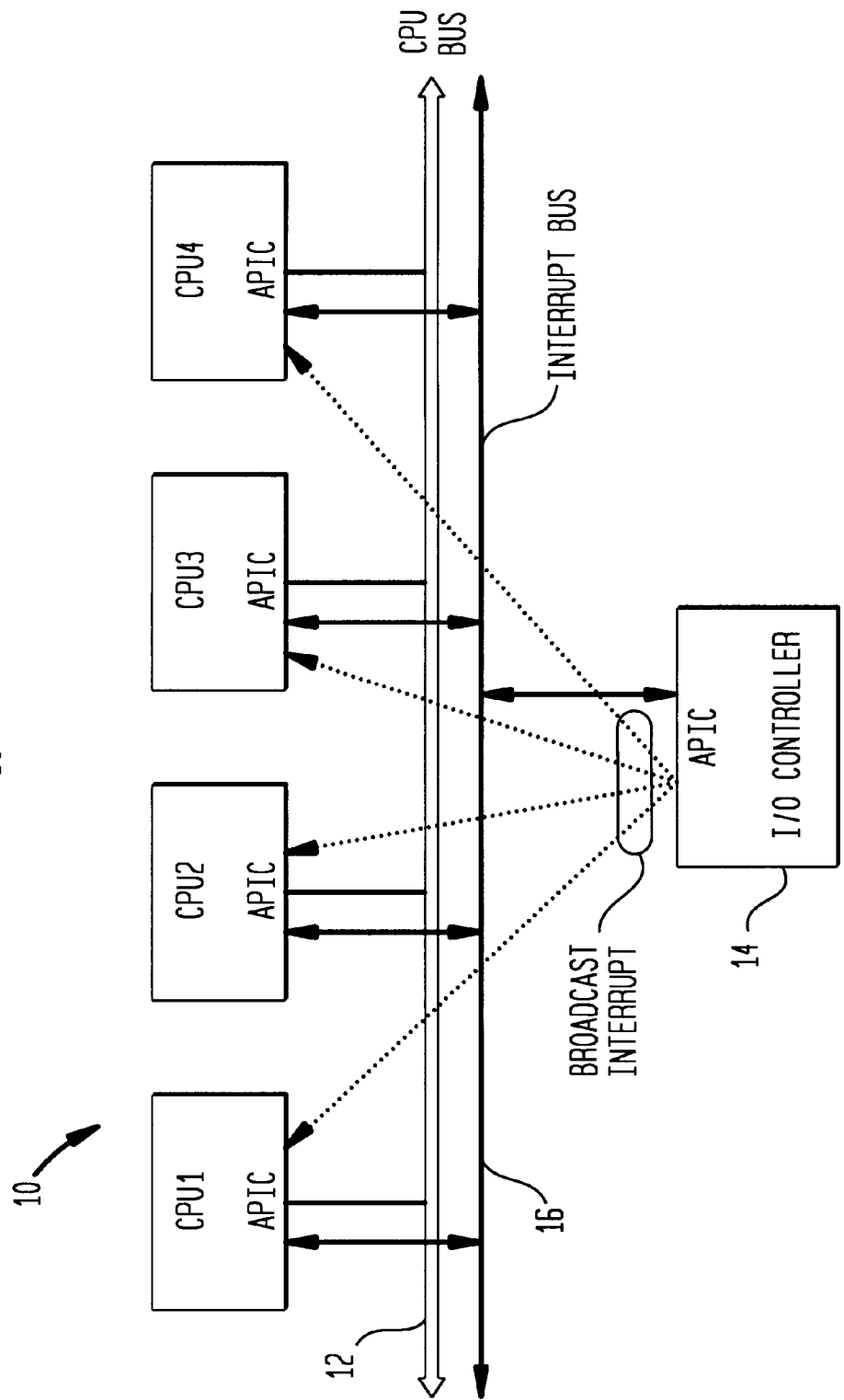
FIGS. 1 and 2 show conventional multiprocessor systems with distributed interrupt control and centralized interrupt control, respectively.
Figure 2:
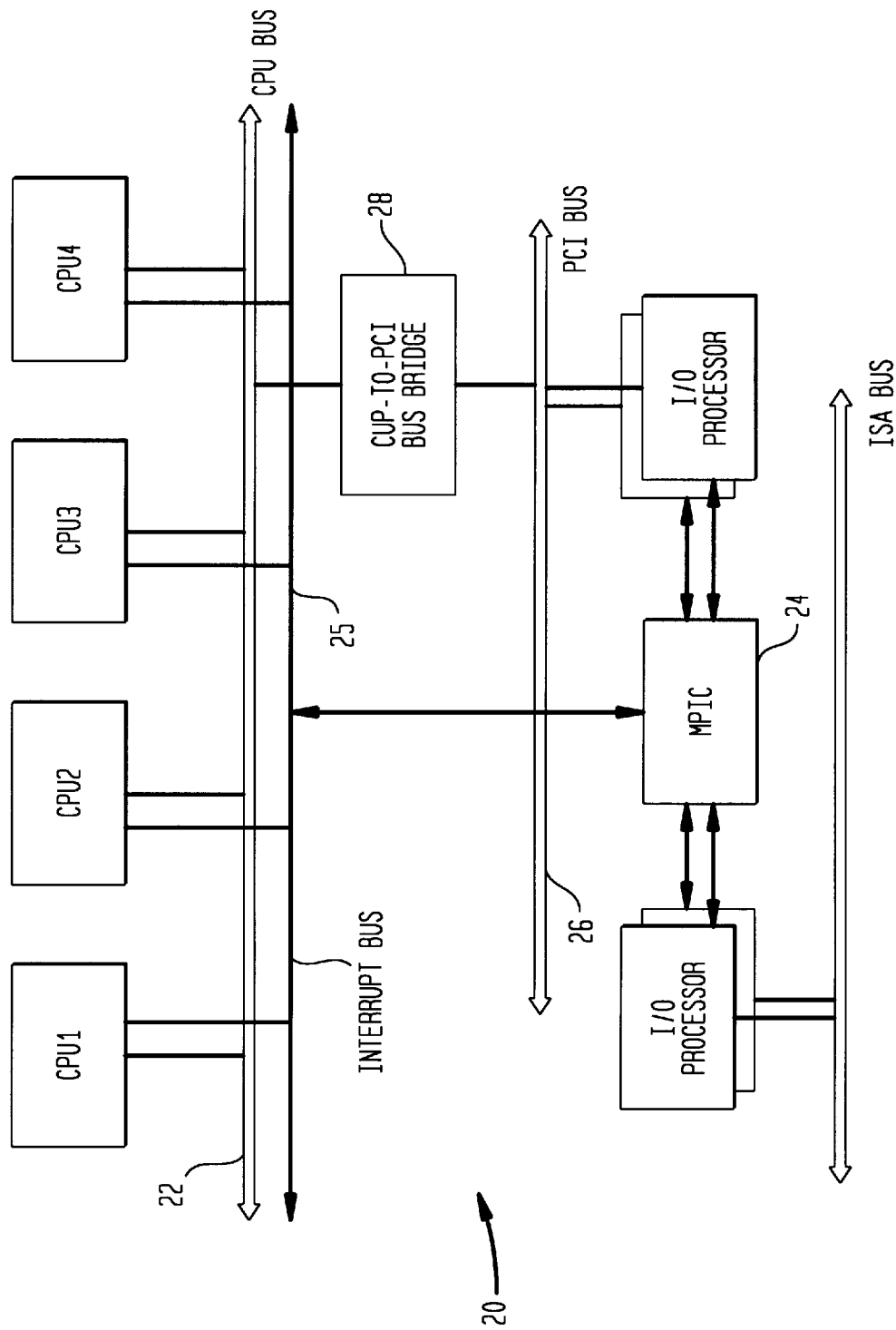
Figure 3:
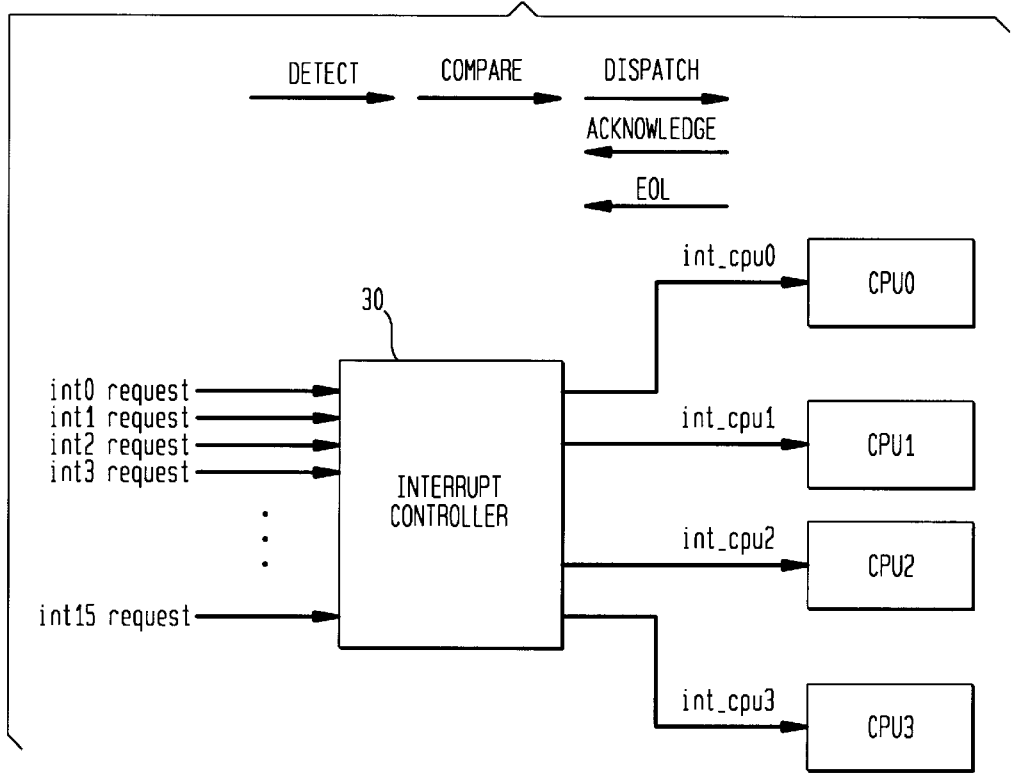
FIG. 3 shows a multiprocessor system with an interrupt controller in accordance with the present invention.

FIG. 3 shows a multiprocessor system in which the present invention may be implemented, and illustrates the basic steps of interrupt processing. The system includes an interrupt controller 30 which is configured to detect and latch in sixteen different interrupt requests int0 through int15. These interrupt requests may be received from peripheral devices such as a keyboard, mouse, monitor, printer and disk drive as well as other elements of a computer system. The interrupt controller 30 compares the relative priority and dispatchability of all pending interrupt requests in a manner to be described below, and dispatches a selected interrupt via interrupt signal lines int_cpu0, int_cpu1, int_cpu2 or int_cpu3 to an appropriate destination CPU of the group of CPUs including CPU0, CPU1, CPU2 or CPU3. A given destination CPU acknowledges to the interrupt controller 30 that an interrupt vector dispatched thereto has been received. This acknowledgement process generally involves the destination CPU reading the interrupt vector of the dispatched interrupt from the corresponding vector register of the interrupt controller. The destination CPU sends an end-of-interrupt (EOI) indication to the interrupt controller to indicate that it has completed processing the interrupt service routine. It should be noted that the number of interrupt requests and CPUs is exemplary only, and that the interrupt processing techniques of the invention are applicable to a wide variety of alternative configurations.

Figure 4:
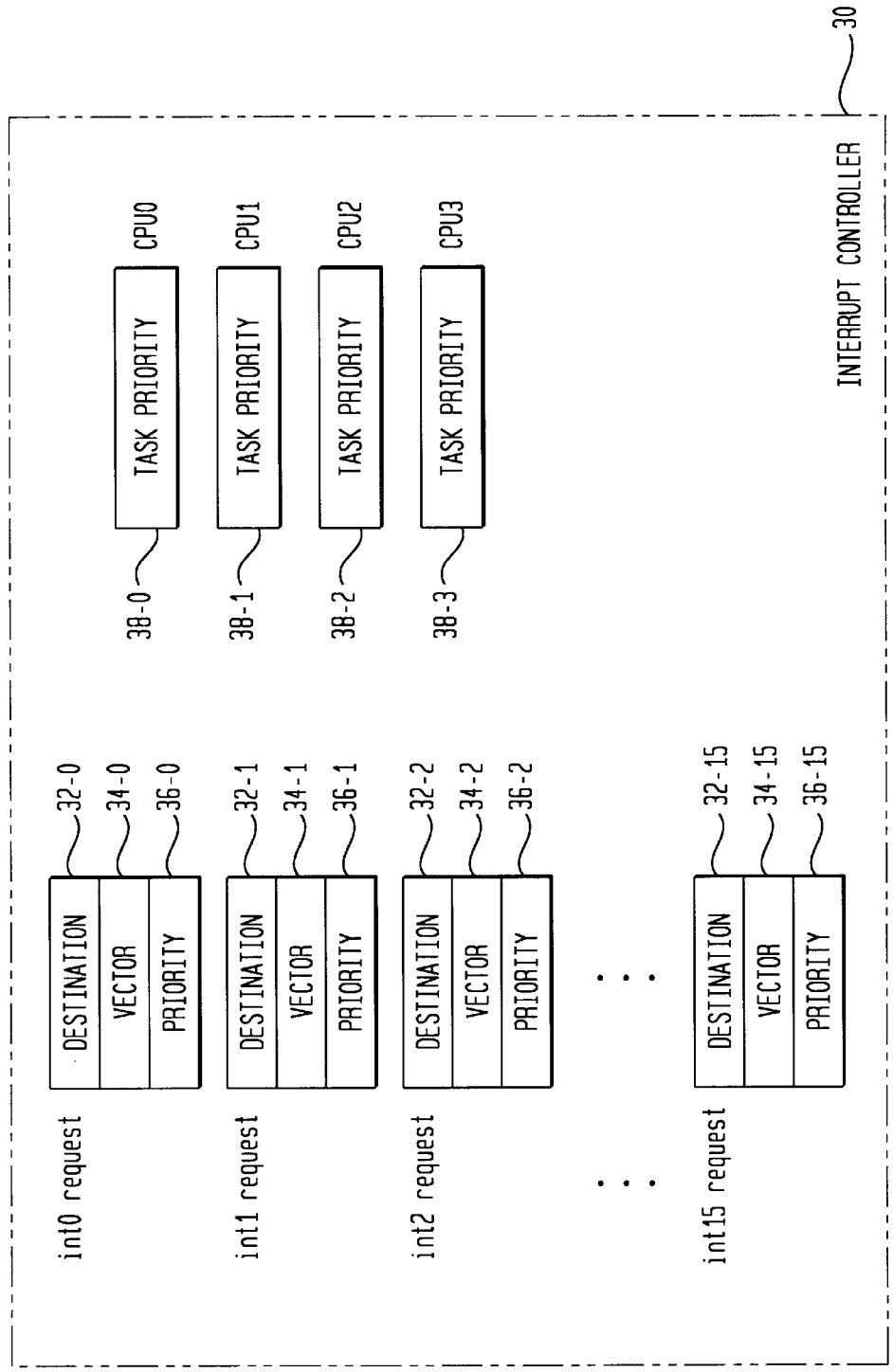
FIG. 4 illustrates an exemplary set of registers suitable for use in the interrupt controller of FIG. 3.

FIG. 4 shows an exemplary set of internal registers of the interrupt controller 30 of FIG. 3. Each of the interrupt requests int0 through int15 has a destination register 32-i, a vector register 34-i and a priority register 36-i associated therewith, where i=0, 1, 2 . . . 15. A given destination register 32-i contains information identifying the particular CPU or CPUs to which the corresponding interrupt request may be directed. A given vector register 34-i contains information identifying an interrupt vector for the corresponding interrupt request. The interrupt vector generally indicates a starting address in system memory for an interrupt service routine for the corresponding interrupt request. A given priority register 36-i contains information identifying the priority of the corresponding interrupt request relative to the other interrupt requests. The interrupt controller 30 also includes a CPU task priority register 38-j for each CPUj, where j=0, 1, 2, 3. A given CPU task priority register 38-j includes information regarding a threshold priority level of interrupt acceptance for the corresponding CPUj. That is, a given CPU task priority register indicates the priority of the task currently being performed by the corresponding CPU, and therefore the minimum level of interrupt priority which the CPU will accept. The destination registers 32-i, vector registers 34-i, priority registers 36-i and CPU task priority registers 38-j may all be implemented as software programmable registers. These registers may be configured in a conventional manner such as that described in the above-cited IBM MPIC reference.

Figure 5:
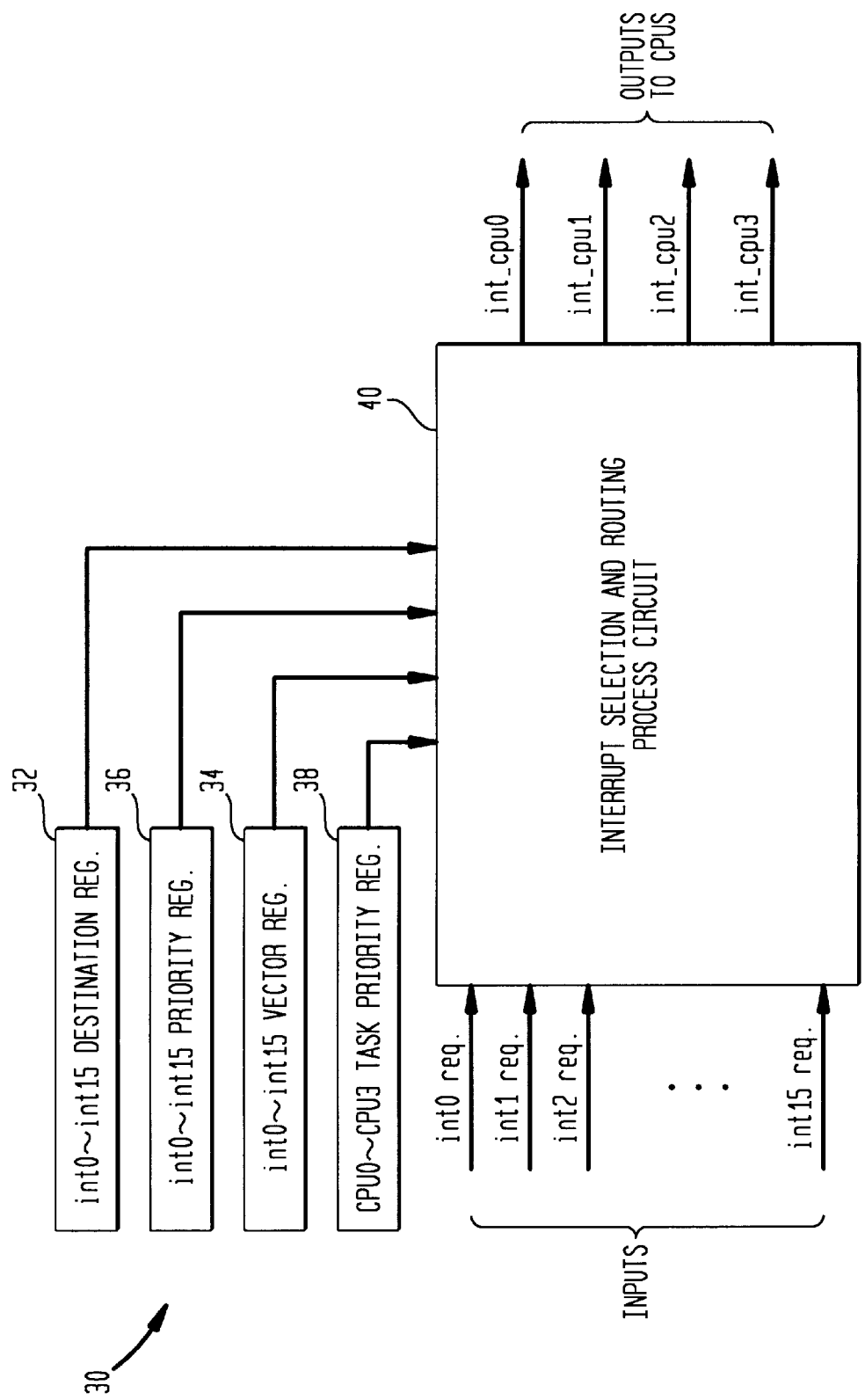
FIGS. 5 and 6 show the exemplary interrupt controller of FIG. 3 in greater detail, which allows the selection and dispatch of non-blocked interrupt requests.
Figure 6:
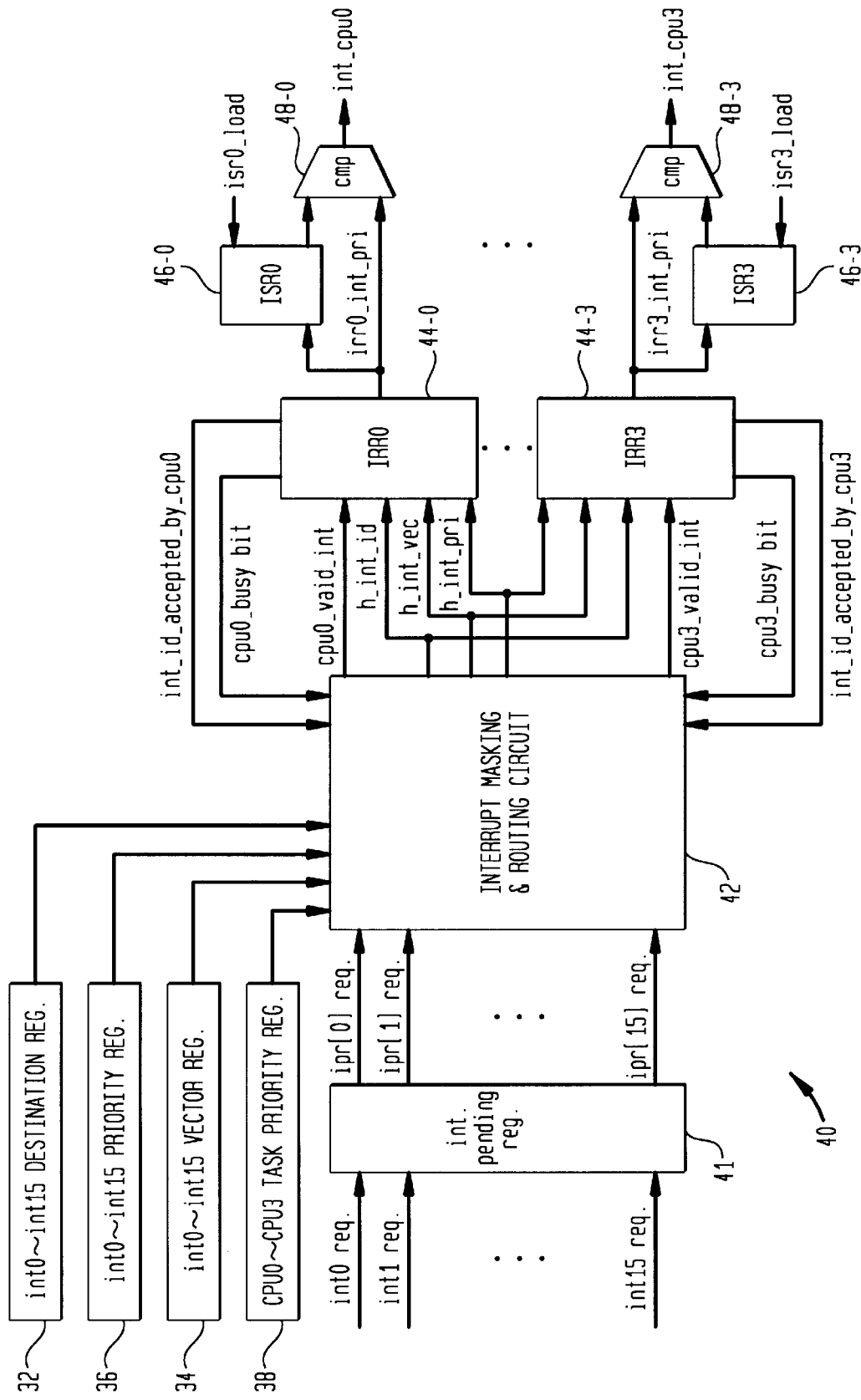

FIG. 5 shows the exemplary interrupt controller 30 of FIG. 3 in greater detail. The interrupt controller 30 includes an interrupt selection and routing process circuit 40 which receives as inputs the int0 through int15 interrupt requests as well as the contents of the destination registers 32, vector registers 34, priority registers 36 and task priority registers 38. The process circuit 40 uses these inputs to generate an interrupt signal int_cpuj for each of the j CPUs. FIG. 6 shows a more detailed block diagram of the interrupt selection process circuit 40 within the exemplary interrupt controller 30. The process circuit 40 includes an interrupt pending register 41 which receives the int0 through int15 interrupt requests as inputs. The register 41 latches these external interrupt requests periodically. The latched interrupt requests are delivered as an interrupt signal ipr[15:0] with each bit ipr[i] indicating the presence or absence of the ith interrupt request when the inputs int0 through int15 were last latched into register 41. The ipr[15:0] signal is delivered to an interrupt masking and routing circuit 42 which also receives the contents of the destination registers 32, vector registers 34, priority registers 36 and CPU task priority registers 38.

The interrupt masking and routing circuit 42 processes the ipr[0] through ipr[15] interrupts using the contents of the registers 32, 34, 36 and 38 to select the highest priority dispatchable or non-blocked interrupt for delivery to a particular CPU or CPUs. A selected interrupt is delivered to one of j interrupt request registers (IRRs) 44-j, j=0, 1, 2, 3. Each of the j IRRs is associated with one of the j CPUs. The interrupt masking and routing circuit 42 delivers the selected interrupt as a one-bit signal cpuj_valid_int, an interrupt identifier h_int_id, the interrupt vector h_int_vec and the interrupt priority h_int_pri. The signals h_int_id, h_int_vec and h_int_pri are supplied to each of the IRRs 44-j, and the signal cpuj_valid_int is used to latch these values for a selected interrupt into a particular one of the IRRs 44-j corresponding to an appropriate destination CPU for that interrupt.

The process circuit 40 further includes j interrupt service registers (ISRs) 46-j, each of which receives an isrj load signal from the corresponding jth CPU. The ISRs 46-j also receive interrupt priority signal irrj_int_pr, which is initially 0. The output of the jth ISR drives one input of a comparator 48-j, while interrupt priority signal irrj_int_pr from the jth IRR drives the other input of comparator 48-j. The output of comparator 48-j is 1 if the irrj_int_pr input is greater than the input from the jth ISR which enables the corresponding jth CPU as interrupt signal int_cpuj. Each of the j IRRs also generates an int_id_accepted_by_cpuj signal and a cpuj_busy bit which are both fed back to the interrupt masking and routing circuit 42. These signals provide information regarding an interrupt already received by the corresponding CPU.

Whenever a new $cpu_j\_valid\_int$ signal is produced by the interrupt masking and routing circuit 42 entering an $IRR_j$ 44-j, the corresponding $IRR_j$ will generate a $cpu_j\_busy\_bit$ signal feedback to circuit 42. When $cpu_j$ acknowledges this interrupt request, the $cpu_j\_busy\_bit$ signal is released, and $IRR_j$ 44-j generates an $int\_id\_accept\_by\_cpu_j$ signal feedback to circuit 42. Finally, when $cpu_j$ finishes servicing the interrupt request (EOI), the signal $int\_id\_accept\_by\_cpu_j$ will be released.

Figure 7:
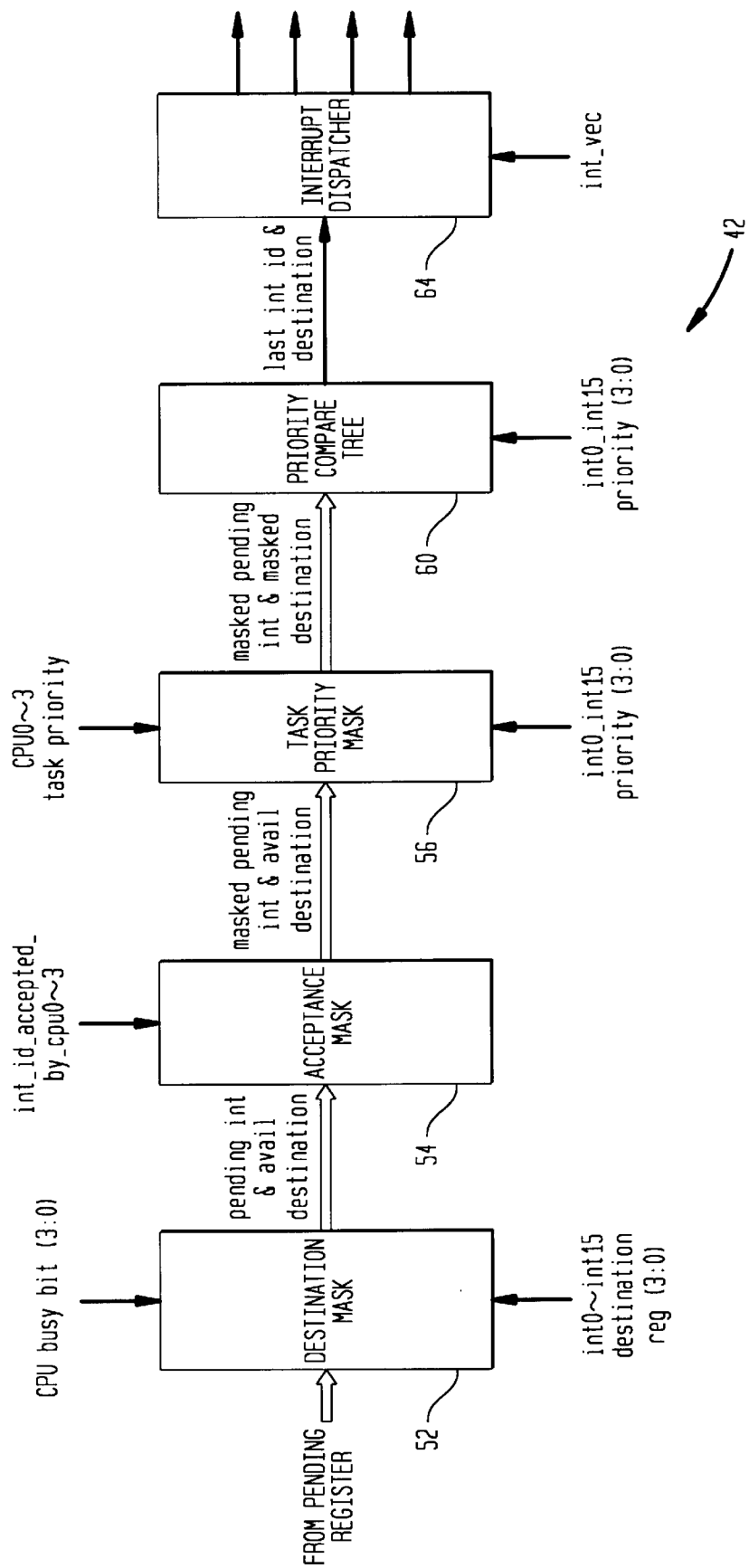
FIG. 7 shows an exemplary interrupt masking and routing circuit suitable for use in the interrupt controller of FIG. 6.
Figure 8A:
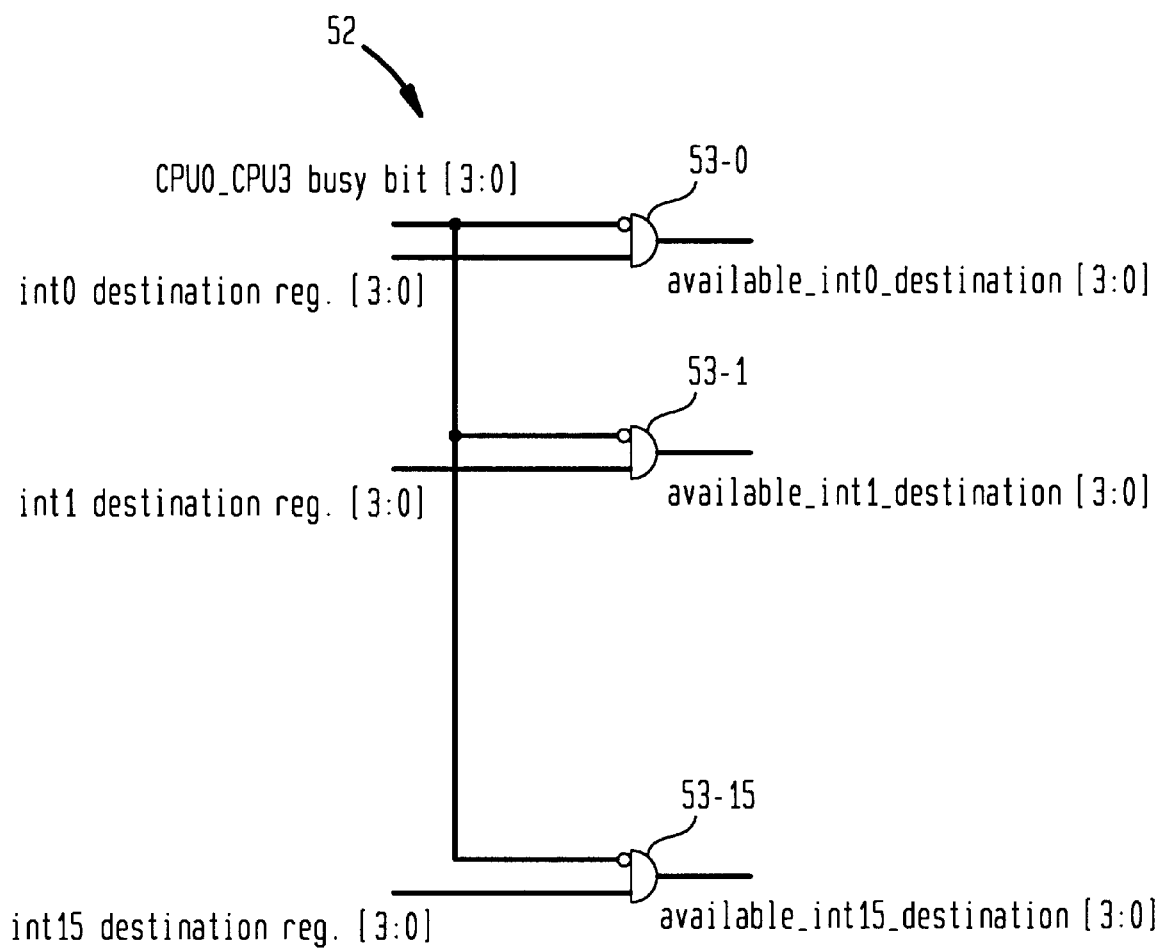
FIGS. 8A, 8B, 8C, 8D, and 8E show exemplary destination mask, acceptance mask, task priority mask, priority compare tree and interrupt dispatcher circuits suitable for use in the interrupt masking and routing circuit of FIG. 7.

FIG. 7 shows a more detailed diagram of an exemplary interrupt masking and routing circuit 42 suitable for use in the interrupt selection and routing process circuit 40 of FIG. 6. The interrupt masking and routing circuit 42 includes a destination mask circuit 52 which receives the [3:0] bits of each of the destination registers 32, and a cpuj_busy bit from each of the four IRRs 44-j. FIG. 8A shows the destination mask circuit 52 in greater detail. The destination mask circuit 52 includes multiple AND gates 53-i for masking the [3:0] destination register bits of those interrupt requests which have a destination CPU which is busy as indicated by the four cpuj_busy bits. The outputs of the multiple AND gates 53-i correspond to four-bit available_inti_destination signals for each of the interrupt requests. A given ith four-bit available_inti_destination signal, which is used in task priority mask 56, will indicate those of all possible CPU destinations for the ith interrupt which are not busy. This masking ensures that the ith interrupt will not be directed to a busy CPU.

Figure 8B:
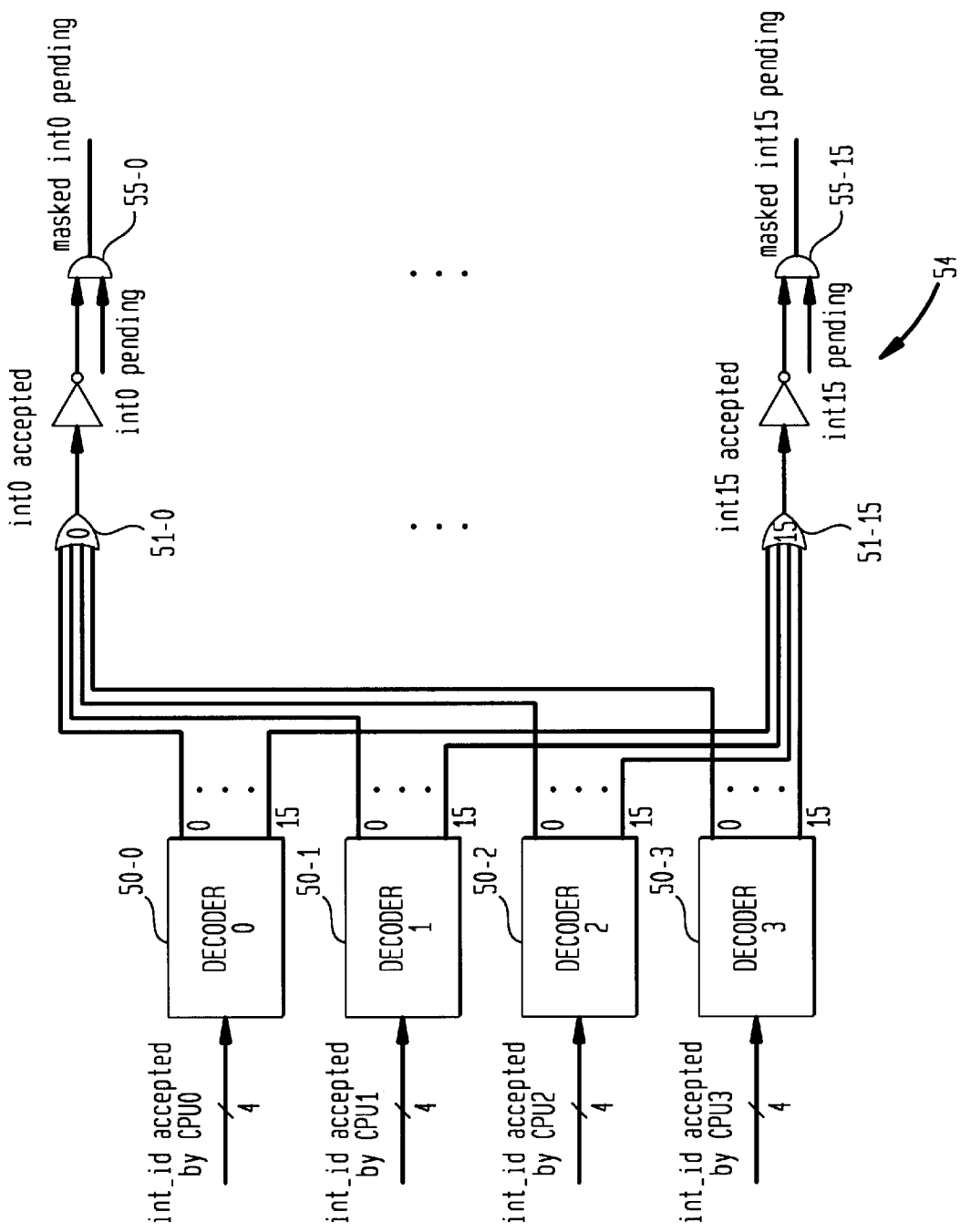

The interrupt masking and routing circuit 42 of FIG. 7 further includes an acceptance mask circuit 54 which receives as inputs the four four-bit int_id_accepted_by_cpuj signals supplied from the four IRRs 44-j. FIG. 8B shows the acceptance mask circuit 54 in greater detail. The acceptance mask circuit 54 includes j decoders 50-j, i OR gates 51-i, and i NOT & AND gates 55-i configured as shown. Each of the four-bit int_id_accepted_by_cpuj is decoded into i independent signals by each of the decoder 50-j. Each of the i OR gates receives one bit signal from each of the decoder 50-j. The i OR gates generate i inti_accepted signals which are supplied to i NOT gates and to i AND gates (55-i) together with inti pending signals.

Figure 8C:
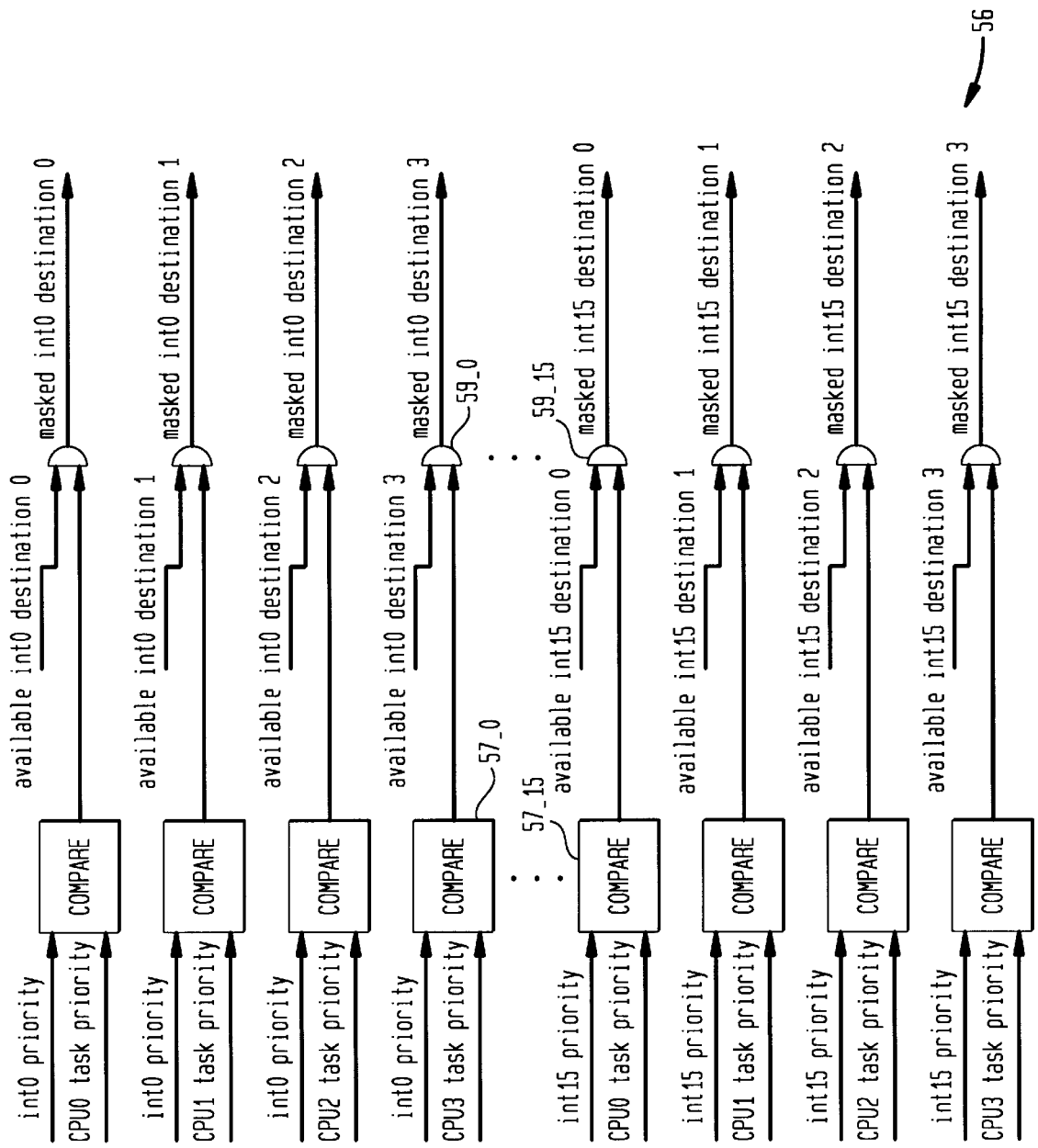

These circuits efficiently mask the interrupts already accepted by the four CPUs and generate new masked inti pending signals that will be used in compare tree circuit 60. FIG. 8C shows the task priority mask circuit 56 of FIG. 7 in greater detail. The circuit 56 includes i circuits, each with four 2-input compare circuits 57-i and four 2-input AND gates 59-i.

Each of the 2-input compare circuits 57-i receives as inputs an inti priority and a cpuj task priority. Circuit 57-i outputs a 0 if the cpuj task priority is higher than the inti priority. Otherwise, circuit 57-i outputs a 1. Each of the four 2-input AND gates 59-i receive as an input the corresponding one bit of the four-bit available_inti_destination signal of each interrupt i from the destination mask circuit 52 and also receives the output from circuit 57-i. The AND 59-i gates generate masked inti destination signals, which indicate whether one of the possible destination CPUs for the ith interrupt is free, and is able to service interrupts.

Figure 8D:
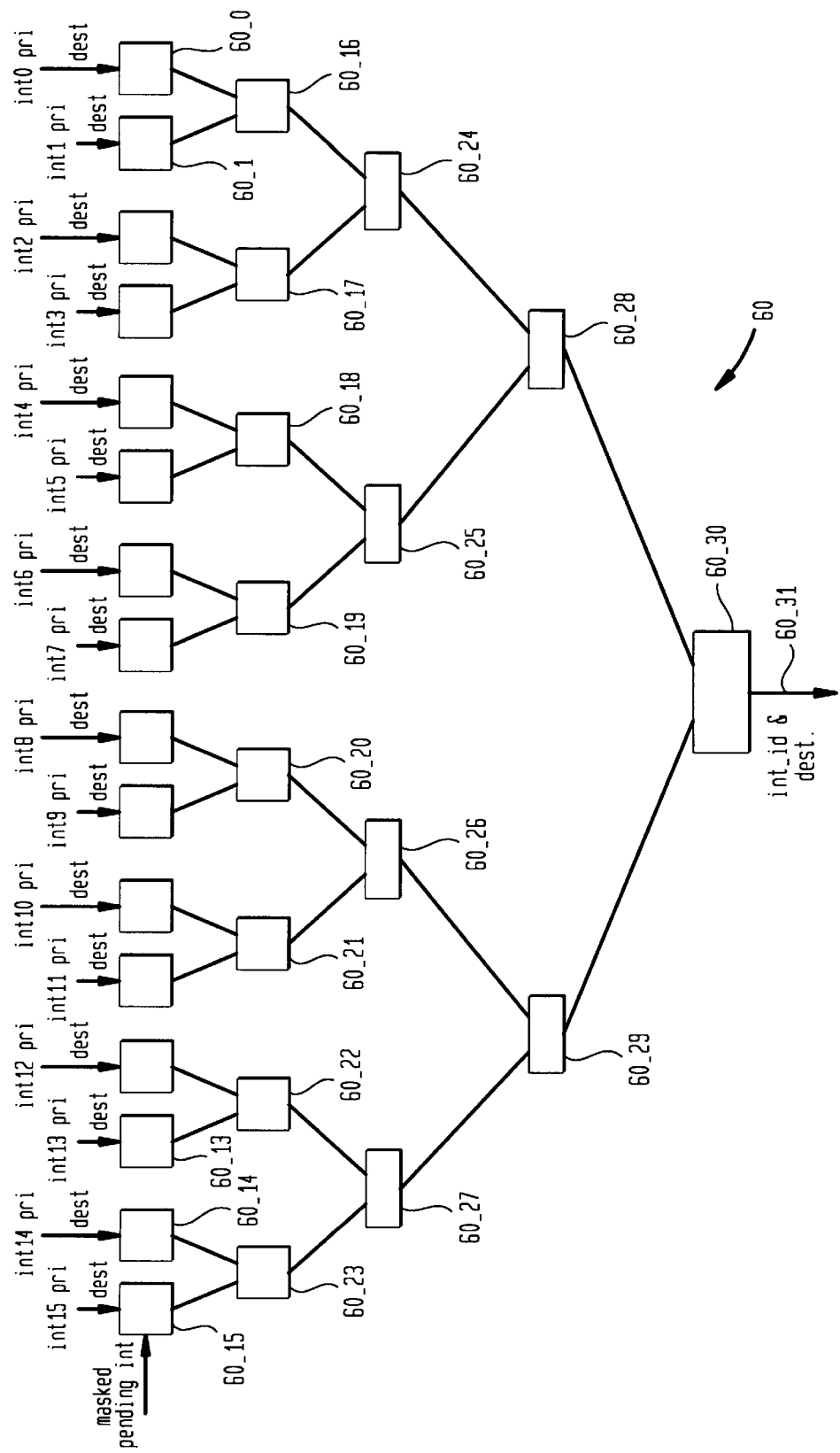

The masked inti destination signals from the task priority mask circuit 56 and the interrupt priority registers 36 (inti id information) are applied to the priority compare tree 60, configured as shown in FIG. 8D. The compare tree circuit 60 includes 16 latches 60-0 to 60-15, and uses pending interrupt signals that are generated from circuit 54 to decide which interrupt i priority can join the comparison. Circuit 60 also includes multiple layer comparator 60-16 to 60-30, illustratively, which determines the highest priority pending interrupt.

Figure 8E:
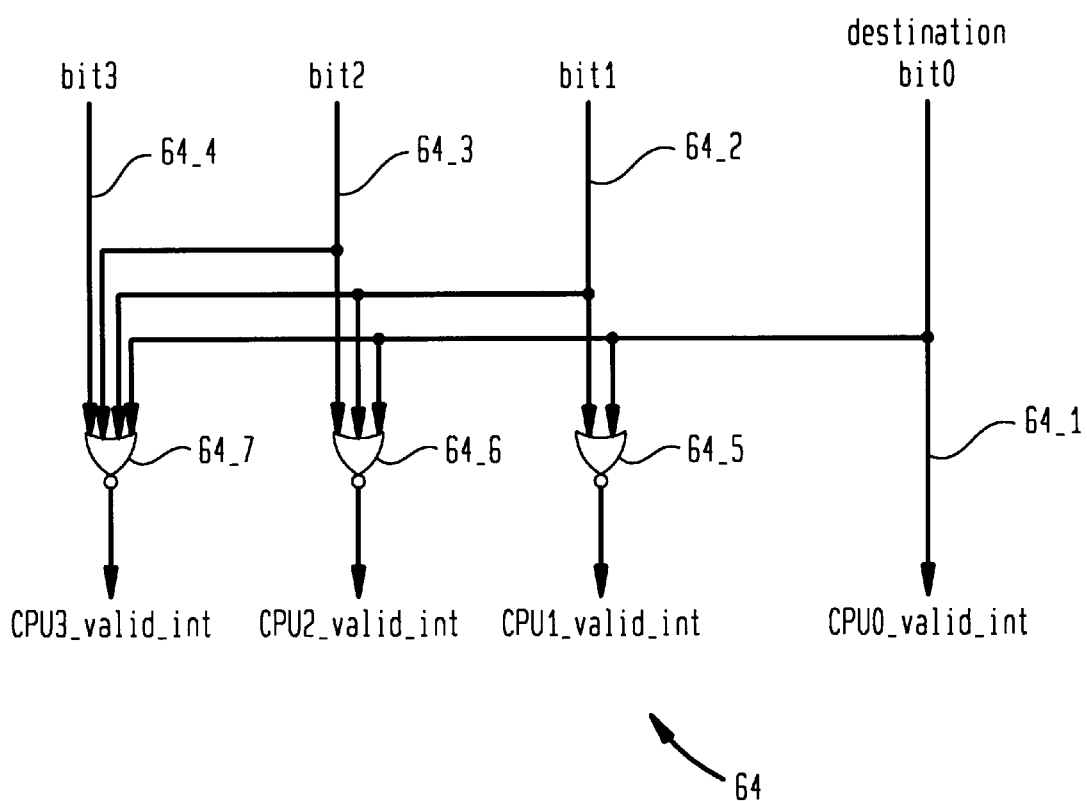

The interrupt dispatcher 64 is used to choose one of the valid destination cpuj to dispatch the non-blocked highest priority pending interrupt. The interrupt vector information is also passed down through circuit 64. As shown in FIG. 8E, when signal 64-1 is 1, the output from gates 64-i will be 0. Similarly, when 64-1 is 0 and 64-2 is 1, the gates 64-6 and 64-7 will output 0, and so choose which of the cpui is valid and ready to service the pending interrupt.

The above-described exemplary interrupt controller provides improved performance in the following manner. The interrupt masking and routing circuit 42 selects and dispatches a given interrupt request to a particular IRR 44-j associated with the jth destination CPU. This interrupt is compared with the current in-service interrupt of the destination CPU as stored in the corresponding ISR 46-j. If the priority of the interrupt in IRR 44-j is greater than the priority of the current in-service interrupt stored in ISR 46-j, then the comparator 48-j enables the interrupt to the jth destination CPU. Otherwise, the interrupt in IRR 44-j is not sent out to the destination CPU until that CPU completes its current in-service interrupt processing operation. In addition, once the interrupt masking and routing circuit 42 selects and dispatches a given interrupt request to a particular IRR 44-j, this interrupt request will not be used in the next selection of interrupts regardless of whether or not it is accepted by its destination CPU. This feature is provided in the controller 30 via the int_id_accepted_by_cpuj signal and cpuj_busy bit applied from the IRR 44-j to the acceptance mask circuit 54 and destination mask circuit 52, respectively. A current dispatched interrupt request in the interrupt controller 30 of the present invention will therefore not block the dispatch of other interrupt requests to other destination CPUs, thereby increasing interrupt processing speed and overall system efficiency.

The conditions for the dispatch of a given interrupt request in the interrupt controller 30 of FIG. 6 may be summarized as follows: (1) at least one of the j IRRs 44-j corresponding to the jth CPU is empty; (2) an interrupt request already dispatched to a given destination CPU will not be selected in the next interrupt selection process; and (3) out of all dispatchable or non-blocked interrupt requests, the highest priority request is selected for dispatch. Conditions (1) and (2) ensure that all of the interrupt requests that are selected by interrupt controller 30 will be dispatched to their destination CPUs regardless of whether or not other higher priority interrupt requests have been blocked. The valid new inti pending and destinations signals applied to the priority compare tree 60 and interrupt dispatcher circuit 64 thus indicate whether at least one of the possible destination CPUs of the ith interrupt is available and whether the ith interrupt has been dispatched as a result of a previous selection process. The interrupt controller is therefore configured to select a dispatchable interrupt request from multiple pending interrupt requests.

An interrupt controller in accordance with the present invention provides a number of advantages relative to prior art controllers. As noted above, prior art controllers are configured such that when all possible destination CPUs of the highest priority interrupt requests are busy, the highest priority interrupt request cannot be dispatched and it blocks other interrupt requests from being dispatched. Prior art interrupt controllers also block other interrupt requests from being selected and dispatched when the highest priority interrupt request is issued but not yet received by the destination CPU. The present invention overcomes these problems and allows non-blocked interrupt requests to be dispatched even if the highest priority interrupt request is blocked or not yet received or accepted by the destination CPU.

Figure 9:
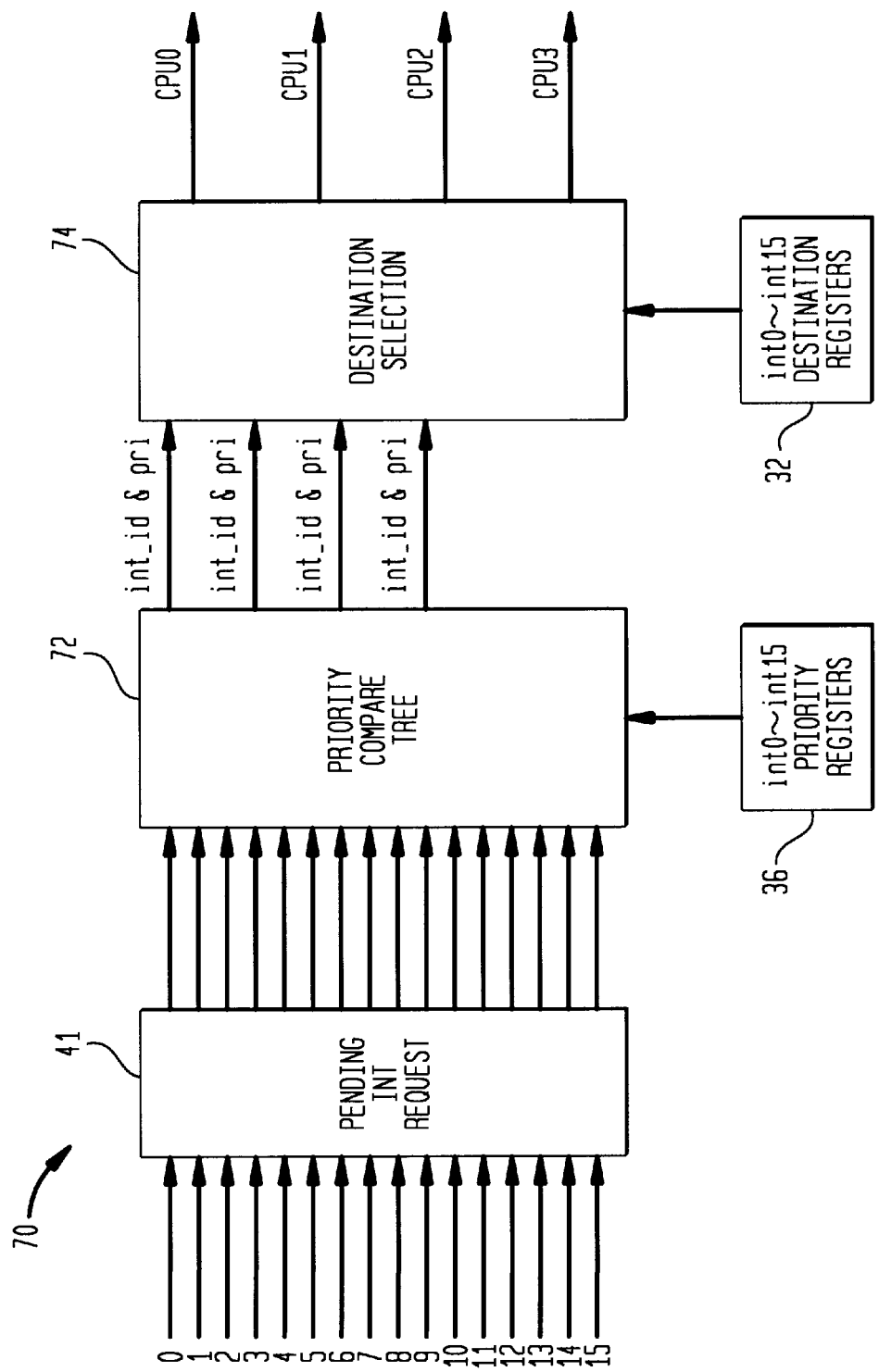
FIG. 9 shows an exemplary embodiment of an interrupt controller with simultaneous delivery of multiple interrupts in accordance with the invention.

FIG. 9 shows another exemplary interrupt controller 70 used to deliver interrupts selected from int0 through int15 to the appropriate destination CPUs CPU0, CPU1, CPU2 and CPU3 as in the previous embodiment. The interrupt controller 70 as illustrated includes the interrupt 0–15 destination registers 32, the interrupt 0–15 priority registers 36, and the pending interrupt request register 41, all of which operate in the manner previously described. The controller 70 may also include other elements of the controller of FIGS. 4–7, such as the vector registers 34. These other elements are omitted from FIG. 9 for clarity of illustration. The interrupt controller 70 further includes a priority compare tree circuit 72 and a destination selection circuit 74. The priority compare tree circuit 72 determines the relative priority of the received interrupt requests, and the destination selection circuit 74 determines a unique destination CPU for each of a number of selected interrupts including the highest priority interrupt. The circuits 72, 74 permit the interrupt controller 70 to select and simultaneously dispatch not only the highest priority interrupt request but also other lower-priority interrupt requests latched into the interrupt pending register 41.

Figure 10:
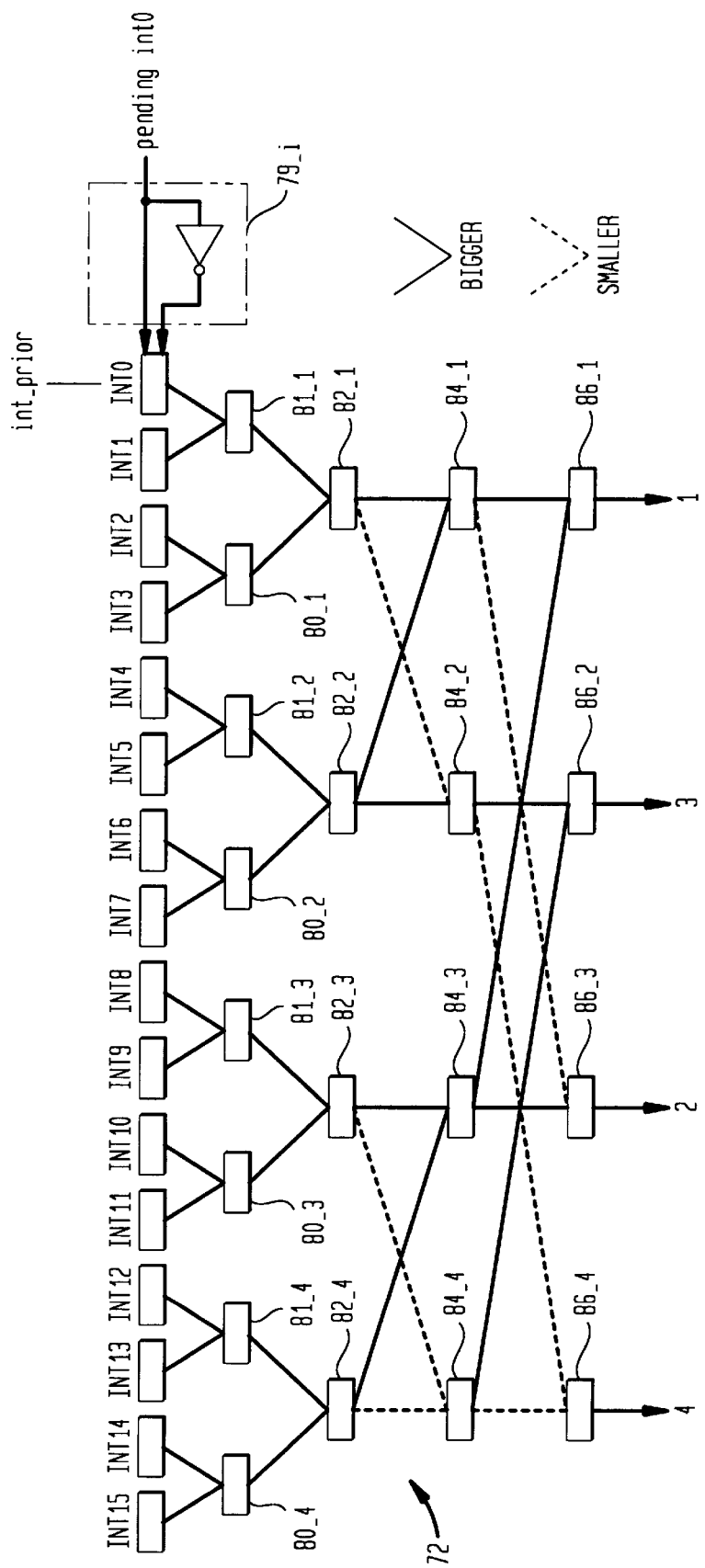
FIG. 10 shows an exemplary priority compare tree circuit suitable for use in the interrupt controller of FIG. 9.

FIG. 10 illustrates the priority compare tree circuit 72 of interrupt controller 70 in greater detail. The pending int bit from pending interrupt register 41 (FIG. 9) loads the corresponding sixteen registers INT0 through INT15 via circuits 79-i, for i=0 to 15. Each register (INT0–INT15) latches a corresponding one of the received into through int15 interrupt requests. The outputs of the registers INT0 through INT15 are applied to a first level of comparators 80-k and 81-k, k=1, 2, 3, 4. Each of the first level comparators 80-k or 81-k perform a pair-wise comparison of the priorities of interrupt requests int0 through int15. The outputs of the first level comparators 80-k and 81-k are applied to a second level of comparators 82-k which perform a pair-wise comparison of the results from the first level of comparators. The outputs of the comparators 82-k are routed to a third level of comparators 84-k in the manner shown in FIG. 10, with the solid line showing the routing for one comparison result and the dashed line showing the routing for the opposite result. The results from the third level of comparators 84-k are similarly routed to a fourth level of comparators 86-k in accordance with the results of the third level comparisons. The result of the multiple-level comparison process is that the output of comparator 86-1 represents the highest priority interrupt request, and the outputs of comparators 86-2, 86-3 and 86-4 represent other three selected interrupts. These interrupt requests are supplied to the four inputs of the destination selection circuit 74. If additional layers of comparators are provided, the interrupts outputted from comparators 86-2, 86-3 and 86-4 would be the second, third and fourth highest priority interrupts, respectively.

FIG. 11 shows the destination selection circuit 74 in greater detail. The four selected interrupt requests are applied to corresponding destination registers 32-i which will store information regarding the possible destination CPUs of each of the interrupt requests. For example, the destination register may be used to store a four-bit indicator, with each bit of the indicator specifying whether or not a particular one of the four CPUs is a possible destination register for the corresponding interrupt request. Then, the destination processor information is applied to a first interrupt dispatcher 64-1, which determines the CPU to which the first priority interrupt request will be dispatched.

The destination selection circuit 74 also uses priority mask circuits 90-i, for i=2 to 4, to control for the fact that there may be overlap in the possible destination CPUs of each of the four selected priority interrupt requests. The destination CPU selected for the first priority interrupt request by the first interrupt dispatcher 64-1 is therefore supplied to a priority mask circuit 90-2 which prevents that CPU from being considered a possible destination CPU for the second selected priority interrupt request. A second interrupt dispatcher 64-2 uses the priority masked destination indication for the second selected priority interrupt request to determine an appropriate destination CPU for the second selected priority interrupt request. The outputs of dispatcher 64-1 and 64-2 are also supplied to a mask circuit 90-3 so that the destination CPUs determined for the first and second priority interrupt requests will not be considered for the third priority interrupt request. A third interrupt dispatcher 64-3 uses the priority and the contents of the third destination register 32-3 to determine an appropriate destination CPU for the third priority interrupt request. The outputs of dispatchers 64-1, 64-2, and 64-3 are also supplied to a mask circuit 90-4 so that the destination CPUs determined for the first, second and third priority interrupt requests will not be considered for the fourth priority interrupt request. A fourth interrupt dispatcher 64-4 uses the priority and the contents of the fourth destination register 32-4 to determine an appropriate destination CPU for the fourth priority interrupt request. The destination selection circuit thus attempts to determine a unique destination CPU for each of the four selected priority interrupt requests identified by the priority compare tree circuit 72. The four bit output signals from dispatcher 64-i (each jth bit corresponding to the jth CPU) will be sent into the corresponding jth OR gate (not shown) in a merge circuit 92_10, to generate the final cpuj__int signals.

In this manner, the interrupt controller 70 is able to ensure that there will be no conflict in the destination CPUs of the four selected priority interrupt requests, and these multiple interrupt requests can therefore be dispatched to different CPUs simultaneously. This provides considerable improvement in overall system efficiency relative to conventional interrupt controllers which are able to dispatch only a single interrupt request at a time. For example, assume that four interrupts are pending in the interrupt controller, and it takes four clock cycles to dispatch a single interrupt. The above-described multiple interrupt dispatching can be performed in about six clock cycles, resulting in a savings of 4×4–6 or 10 clock cycles.

In another embodimnent, the present invention provides for dispatching multiple interrupt requests simultaneously, while also enabling non-blocked interrupt requests having a lower priority to be processed. This is achieved by replacing the priority compare tree 60 and dispatcher circuit 64 of FIG. 7 with the priority compare tree circuit 72 and destination selection circuit 74 of FIG. 9.

It should be understood that the foregoing description is merely illustrative of the invention. Numerous alternative embodiments within the scope of the appended claims will be apparent to those of ordinary skill in the art.

The claimed invention is:

1. A method of processing interrupt requests in a system having a plurality of processors, each of the interrupt requests having at least one destination processor associated therewith for servicing the interrupt request, the method comprising the steps of:

masking those of the plurality of interrupt requests for which the destination processors associated therewith are unavailable at a given time, the step of masking including the steps of:

applying a processor availability indicator for each of the plurality of processors to a destination mask circuit;

utilizing the processor availability indicator to mask contents of destination registers associated with interrupt requests having an unavailable destination processor associated therewith as indicated by the processor availability indicators, and generating available interrupt destination indicators associated with each of the destination processors for each of the interrupt requests; and selecting from the remainder of the plurality of interrupt requests a particular interrupt to be delivered to an available destination processor associated with the particular interrupt request.

2. The method of claim 1 wherein the step of selecting from the remainder of the plurality of interrupts a particular interrupt to be delivered to an available destination register further includes the step of selecting a highest priority interrupt request from the remaining interrupt requests.

3. The method of claim 1 wherein the step of masking those of the plurality of interrupt requests for which the destination processors associated therewith are unavailable at a given time further includes the steps of:

applying cpu task priority identifiers for each destination processor to a task priority mask circuit for the comparison of cpu task priority;

applying said available interrupt destination indicators to the said task priority mask circuit; and generating masked interrupt destination signals indicative of the availability of the destination processors for each of the interrupt requests.

4. A method of processing interrupt requests in a system having a plurality of processors each of the interrupt requests having at least one destination processor associated therewith for servicing the interrupt request the method comprising the steps of:

masking those of the plurality of interrupt requests for which the destination processors associated therewith are unavailable at a given time, wherein the step of masking those of the plurality of interrupt requests for which the destination processors associated therewith are unavailable at a given time further includes the steps of:

applying accepted interrupt request identifiers for each interrupt request accepted by the destination processors at a previous time to an acceptance mask circuit; and generating masked interrupt pending signals indicative of the interrupt requests that could be accepted by the destination processors; and selecting from the remainder of the plurality of interrupt requests a particular interrupt to be delivered to an available destination processor associated with the particular interrupt request.

5. A method of processing interrupt requests in a system having a plurality of processors, each of the interrupt requests having at least one destination processor associated therewith for servicing the interrupt request the method comprising the steps of:

masking those of the plurality of interrupt requests for which the destination processors associated therewith are unavailable at a given time, wherein the step of masking those of the plurality of interrupt requests for which the destination processors associated therewith are unavailable at a given time further includes the steps of:

masking contents of destination registers associated with interrupt requests having an unavailable destination processor associated therewith, as indicated by processor availability indicators, and as indicated by cpu task priority identifiers, and generating masked interrupt destination signals indicative of the availability of the destination processors for each of the interrupt requests, and masking contents of interrupt pending registers associated with interrupt requests having an unavailable destination processor associated therewith, as indicated by accepted interrupt request identifiers, and generating masked interrupt pending signals indicative of the interrupt requests that could be accepted by the destination processors; and selecting from the remainder of the plurality of interrupt requests a particular interrupt to be delivered to an available destination processor associated with the particular interrupt request.

6. The method of claim 1 further including the step of determining whether to deliver a selected interrupt request to a particular destination processor based on a comparison of a priority of the selected interrupt request with a priority of another interrupt request currently being serviced by the destination processor.

7. The method of claim 6 wherein the step of determining whether to deliver a selected interrupt request to a particular destination processor further includes the steps of:

storing the selected interrupt request and its corresponding priority in an interrupt request register associated with the destination processor;

storing a priority of an interrupt request currently being serviced by the destination processor in an in-service register associated with the destination processor;

comparing the priority of the selected interrupt request stored in the interrupt request register with the priority of the in-service interrupt request stored in the in-service register to determine whether or not the selected interrupt request should be delivered to the particular destination processor.

8. An interrupt controller for processing interrupt requests in a system having a plurality of processors, each of the interrupt requests having at least one destination processor associated therewith for servicing the interrupt request, the interrupt controller comprising:

a mask circuit for masking those of the plurality of interrupt requests for which the destination processors associated therewith are unavailable at a given time, said mask circuit further includes a destination mask circuit which receives a processor availability indicator for each of the plurality of processors to a destination mask circuit, wherein the destination mask circuit utilizes the processor availability indicator to mask contents of destination registers associated with interrupt requests having an unavailable destination processor associated therewith, as indicated by the processor availability indicators, and generates available interrupt destination signals associated with each of the destination processors for each of the interrupt requests; and a priority comparison circuit and interrupt dispatch circuit for selecting from the remainder of the plurality of interrupt requests a particular interrupt to be delivered to an available destination processor associated with the particular interrupt request.

9. The interrupt controller of claim 8 wherein the priority comparison circuit selects a highest priority interrupt request from the remaining interrupt requests.

10. An interrupt controller for processing interrupt requests in a system having a plurality of processors, each of the interrupt requests having at least one destination processor associated therewith for servicing the interrupt request the interrupt controller comprising:

a mask circuit for masking those of the plurality of interrupt requests for which the destination processors associated therewith are unavailable at a given time;

a priority comparison circuit and interrupt dispatch circuit for selecting from the remainder of the plurality of interrupt requests a particular interrupt to be delivered to an available destination processor associated with the particular interrupt request; and an acceptance mask circuit which receives accepted interrupt request identifiers for each interrupt request accepted by the destination processors at a previous time, and generates a masked interrupt pending signal indicative of the interrupt requests that could be accepted by the destination processors.

11. The interrupt controller of claim 8 wherein the mask circuit further includes:

a task priority mask circuit for receiving the said available interrupt destination signals and cpu task priority identifiers associated with the destination processors, the task priority mask circuit generating masked interrupt destination signals indicative of the availability of the destination processors for each of the interrupt requests.

12. The interrupt controller of claim 8 wherein the priority comparison circuit determines whether to deliver a selected interrupt request to a particular destination processor based on a comparison of a priority of the selected interrupt request with a priority of another interrupt request currently being serviced by the destination processor.

13. The interrupt controller of claim 12 wherein the interrupt controller further includes:

an interrupt request register associated with the destination processor for storing the selected interrupt request and its corresponding priority;

an in-service register associated with the destination processor for storing a priority of an interrupt request currently being serviced by the destination processor; and a comparator for comparing the priority of the selected interrupt request stored in the interrupt request register with the priority of the in-service interrupt request stored in the in-service register to determine whether or not the selected interrupt request should be delivered to the particular destination processor.

\* \* \* \* \*